United States Patent [19]

Benzinger et al.

[11] Patent Number: 5,064,254
[45] Date of Patent: Nov. 12, 1991

[54] HYDRAULIC BRAKE SYSTEM WITH REVERSIBLE PUMP FOR TRACTION CONTROL

[75] Inventors: Roland Benzinger; Heinz Siegel, both of Stuttgart; Erhard Ellendt, Hemmingen; Ewald Huebl, Schwieberdingen; Rolf Igelmann, Gerlingen; Walter Steinhauser, Schwieberdingen, all of Fed. Rep. of Germany

[73] Assignee: Robert Bosch GmbH, Stuttgart, Fed. Rep. of Germany

[21] Appl. No.: 542,137

[22] Filed: Jun. 22, 1990

[30] Foreign Application Priority Data

Jul. 18, 1989 [DE] Fed. Rep. of Germany ....... 3923742

[51] Int. Cl.$^5$ .................. B60T 8/50; B60T 13/20
[52] U.S. Cl. .................. 303/113 TR; 303/110; 303/115 EC
[58] Field of Search .............. 303/110, 116, 105, 115, 303/61, 9.62, 9.71, 9.73, 9.74, 93, 113, 114; 180/197

[56] References Cited

U.S. PATENT DOCUMENTS

| | | | |
|---|---|---|---|
| 4,082,369 | 4/1978 | Black et al. | 303/3 |
| 4,129,342 | 12/1978 | Sato et al. | 303/113 X |
| 4,175,794 | 11/1979 | Pauwels | 303/105 |
| 4,457,563 | 7/1984 | Farr | 303/92 |
| 4,575,161 | 3/1986 | Vanzant et al. | 303/110 |
| 4,927,213 | 5/1990 | Burgdore | 303/116 |
| 4,986,612 | 1/1991 | Arikawa | 180/197 X |

FOREIGN PATENT DOCUMENTS 2913577 11/1979 Fed. Rep. of Germany .

Primary Examiner—Matthew C. Graham
Assistant Examiner—Josie A. Ballato
Attorney, Agent, or Firm—Edwin E. Greigg; Ronald E. Greigg

[57] ABSTRACT

A brake system including an apparatus for limiting drive slip at drivable vehicle wheels by feeding brake pressure into wheel brakes associated with these vehicle wheels. The brake pressure is generated in a pressure modulator having a spring-loaded stepped piston including a primary piston. The primary piston can be acted upon by pressure fuid from a supply container by a motor which drives a pump. A secondary piston of the stepped piston effects the brake pressure and feeds it via a valve assembly into a brake line extending between the master brake cylinder of the brake system and a wheel brake. The brake pressure can be diminished by controlling the drive motor of the pump. The pump is embodied with reversible pumping directions, and the pressure fluid flows through it both during a working stroke and a return stroke of the stepped piston. The valve assembly is actuatable by the stepped piston as a function of the position thereof. The apparatus uses the pump drive alone in order to generate brake pressure, and uses the position of the stepped piston to actuate the valve assembly. This makes it possible to dispense with magnetic valves.

12 Claims, 2 Drawing Sheets

HYDRAULIC BRAKE SYSTEM WITH REVERSIBLE PUMP FOR TRACTION CONTROL

BACKGROUND OF THE INVENTION

The invention is based on a hydraulic brake system for a vehicle as defined herein. Such a brake system is already known from German Offenlegungsschrift 29 13 577, in which an apparatus for traction control associated with a driven wheel also serves as an anti-skid device. Since both this apparatus and a second apparatus of this type associated with the other driven wheel of the vehicle are supplied by a common pressure fluid source from a pressure fluid supply container, two magnetic valves switched by a control unit are needed in order to be able to perform both functions. To return the pressure fluid, a return line leading to the supply container is connected to the apparatus. An adjustable counter piston is also associated with the primary piston in order to attain an intermediate position of the stepped piston, in which this stepped piston keeps a spring-loaded check valve open in order to bypass the valve assembly between the master brake cylinder and the wheel brake. Moreover, a piston that can be acted upon by the pressure fluid is also provided in the apparatus, in order to actuate the valve assembly. The overall structure of the apparatus is complicated and accordingly expensive to produce, as well as vulnerable to malfunction.

OBJECT AND SUMMARY OF THE INVENTION

The brake system according to the invention has an advantage over the prior art in that the apparatus, intended solely for traction control, makes do without expensive magnetic valves that are likely to malfunction, because for controlling brake pressure only the pump drive is used, and for actuating the valve assembly the piston position is used. The line layout between the pump and the pressure modulator is also simplified.

The further improvement of the brake system defined herein is advantageous because this type of pump has a relatively small structural volume, can be operated at high rpm, is simple in structure, and is particularly reliable for the intended purpose.

With one feature disclosed herein, a reduction in the size of the apparatus and a simultaneous increase in operating safety is attained, because pipelines between the elements carrying pressure fluid are dispensed with.

An improvement of the invention is further defined herein and relates to protecting the pump and its drive against overload.

With a further feature of the invention, an aspiration of air from the bore chamber into the pressure-fluid-filled portion of the pressure modulator toward the pump is avoided, because otherwise, at the end of the return stroke of the piston, the rotating motor armature would cause the pump to keep running, causing the aspiration of air.

Suitable features of a clutch are disclosed; of these, a free-wheel clutch is particularly suitable, because in the version known as a sleeve-type free-wheel clutch, it has a very small structural volume and operates automatically.

The provision disclosed relates to a check valve that prevents a return flow of pressure fluid and is advantageous because it delays the return flow with pressure reduction and reduces the drive energy imparted in this process to both the pump and the motor, thereby lessening the danger of air aspiration into the pressure fluid.

The feature of the brake system including a brake valve assembly having a seat and a spring-loaded closing element disposed in a pressure modulator housing has the advantage that because of the mechanical association of the valve assembly with the piston, the valve actuation, or in other words the opening up of the pressure course between the master brake cylinder and the wheel brake after a traction control operation, is reliably attained.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
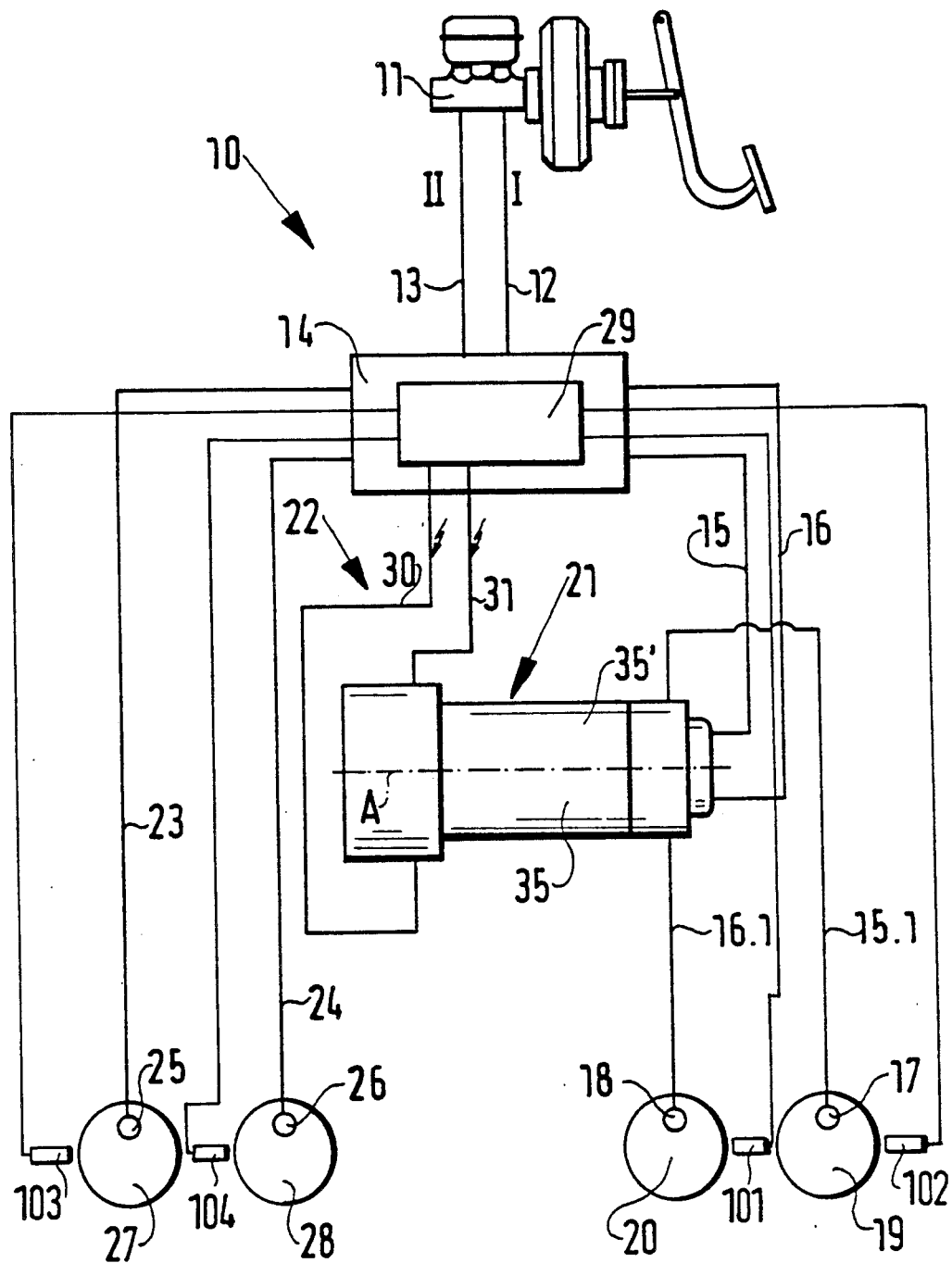
FIG. 1 schematically shows a hydraulic vehicle brake system having a pressure generator unit.

The layout of a hydraulic vehicle brake system 10 shown in FIG. 1 has a pedal-actuated master brake cylinder 11 for generating brake pressure. Connected to the master brake cylinder 11 are a master brake line 12 for a brake circuit I and a master brake line 13 for a brake circuit II. The master brake lines 12 and 13 discharge into a hydraulic unit 14 of an anti-skid apparatus. In the brake circuit I, wheel brake lines 15, 15.1 and 16, 16.1, respectively, lead from the hydraulic u nit 14 to wheel brake cylinders 17 and 18 of the wheel brakes 19 and 20 of driven wheels of a first vehicle axle. One pressure generator unit 21 of an apparatus 22 for limiting drive slip, i.e., controlling traction, of the wheels of the first vehicle axle is located between the respective wheel brake lines 15 and 15.1 and 16 and 16.1. The pressure generator unit 21 is described in greater detail hereinafter. In the brake circuit II, wheel brake lines 23 and 24 are also connected to the hydraulic unit 14. The wheel brake lines 23 and 24 lead to wheel brake cylinders 25 and 26 of the wheel brakes 27 and 28 of non-driven wheels of a second vehicle axis. An electronic control unit 29 for monitoring wheel rotation by use of sensors 101, 102, 103, 104 and triggering the hydraulic unit 14 for anti-skid operation or triggering the pressure generator unit 21 for traction control upon startup and acceleration of the vehicle is also provided. Solenoids and a return pump, not shown in detail, are also incorporated in the hydraulic unit 14, so that in the event of the danger of locking of at least one wheel, the brake pressure in the appropriate wheel brake cylinder can be lowered, maintained or raised. If wheel slip of at least one of the driven wheels arises, the control unit 29, via lines 30 and 31, switches the pressure generator 21 on, in order to feed brake pressure into the applicable wheel brake cylinder and to adapt the rpm of the wheel to the conditions of the road surface.

The pressure generator unit 21 has one pressure modulator, 35 or 35' each, associated with the respective wheel brake cylinders 17 and 18. Since the pressure modulators 35 or 35' are identical in structure and are disposed symmetrically to an axis A, the detailed illustration in FIG. 2 and the ensuing description will be limited to the pressure modulator connected to the wheel brake lines 16 and 16.1.

The pressure modulator 35 has a housing 38 substantially comprising a housing part 36 and a connection head 37 joined to it. The housing part 36 has a cylindrical bore 39, in which a stepped piston 40 with its primary piston 41 is longitudinally guided. On its end remote from the connection head 37, the bore 39 is tightly closed by a bottom plate 42 having a through bore 43. From the connection head 37, a fittingly embodied cylinder 46 having a through bore 47 is introduced into the bore 39 of the housing part 36. The secondary piston 48 of the stepped piston 40 engages the inside of the through bore 47. The cylinder insert 46 and the stepped piston 40 define an air-filled chamber 49 of the bore 39. A restoring helical compression spring 50 is received in the bore chamber 49, supported at one end against the cylinder insert 46 and at the other against the primary piston 41 of the stepped piston 40. The bore chamber 49 communicates with the ambient air via an air filter 51. The bore chamber 49 is sealed off against the entry of liquid, specifically by means of a seal 52 received circumferentially by the primary piston 41 and a seal 53 disposed in the through bore 47 and cooperating with the secondary piston 48.

The connection head 37 of the pressure modulator 35, which fixes the cylinder insert 46 in its installed position, has a line connection 56 for connection of the wheel brake line 16 leading to the master brake cylinder 11. The connection head 37 is also provided with a line connection 57 with the wheel brake line 16.1 connected to the wheel brake cylinder 18. Between the two line connections 56 and 57 is a chamber 58 of the connection head 37, extending coaxially with the bores 39 and 47. The chamber 58 receives a valve assembly 59 having a spherical movable closing element 60 and a valve seat 61 formed by the connection head 37. The closing element 60 of the valve assembly 59 is connected to a tappet 62, extending coaxially with the through bore 47, and the tappet is engaged by a closing compression spring 63 supported on the cylinder insert 46. On its side toward the piston, the tappet 62 is provided with a collar 64 that engages the inside of a longitudinal bore 65 of the secondary piston 48. In the terminal position shown of the stepped piston 40, the closing element 60 of the valve assembly is in its open position, because of the form-fitting engagement of the secondary piston 48 with the collar 64 of the tappet 62, so that the pressure course is open from the master brake cylinder 11 to the wheel brake cylinder 18 of the wheel brake 20, via the master brake line 12, the hydraulic unit 14, and the wheel brake lines 16 and 16.1. Brake fluid positively displaced in the master brake cylinder 11 can therefore build up pressure in the wheel brake cylinder 18 during normal braking operation.

Figure 2:
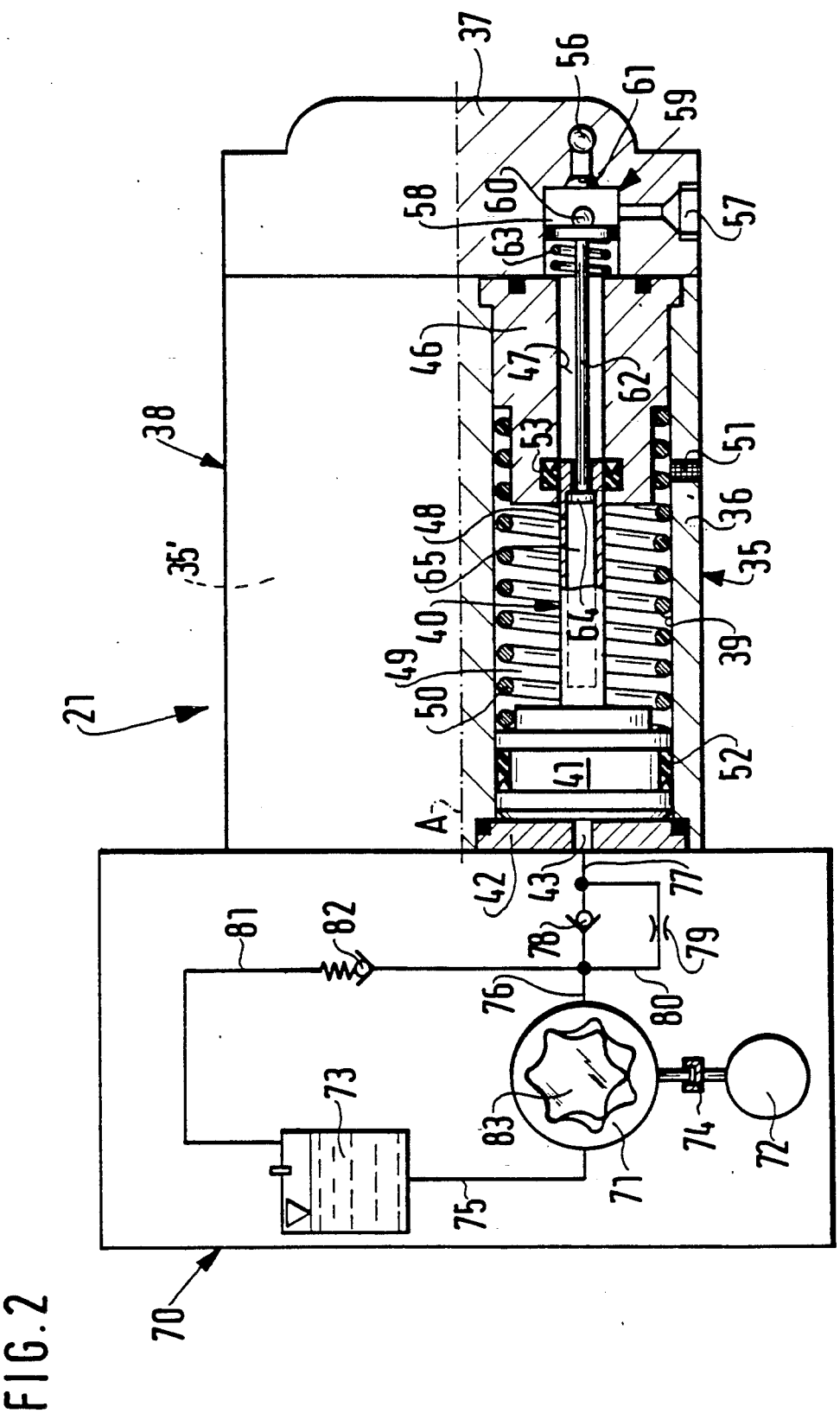
FIG. 2 shows the pressure generator unit in a longitudinal section through a pressure modulator, on a larger scale than that of FIG. 1.

A pump housing 70 is joined to the housing 38 of the pressure modulator 35, on the side remote from the connection head 37. As FIG. 2 schematically shows, a pump 71 having an electric drive motor 72 and a supply container 73 for pressure fluid are disposed in the pump housing 70. The pump 71 is embodied as a gear pump with internal teeth. It is available on the market, for example under the brand name "GEROTOR" made by the W. H. Nichols Company. The drive motor 72 is a permanent-magnet-excited direct current motor. The pump 71 and the motor 72 are connected by a clutch 74, which may be embodied as a free-wheel clutch or as a shifting clutch. The pump 71 communicates through an intake line 75 with the supply container 73, which is equalized in pressure with the atmosphere. From the pressure outlet 76 of the pump 71, a pressure line 77 leads to the through bore 43 of the bottom plate 42 of the pressure modulator 35. A one-way check valve 78 that blocks the return flow of pressure fluid from the pressure modulator 35 to the pump 71 is disposed in the pressure line 77. Parallel to the check valve 78 is a throttle 79, which is disposed in a bypass line 80 connected to the pressure line 77. A line 81 is connected to the pressure line 77 and has a spring-loaded one-way check valve 82 in a portion which leads from the pressure outlet 76 of the pump 71 to the supply container 73. The aforementioned elements are likewise present for the second pressure modulator contained in the housing 38. To simplify the pressure generator unit 21, however, the pumps 71 of both pressure modulators 35 and 35' can be supplied with pressure fluid from a common supply container 73.

The electronic control unit 29 of the apparatus 22 monitors the rotation of the wheels of the vehicle. If drive slip occurs at a wheel upon startup or acceleration of the vehicle, the pressure generator unit 21 is activated by the control unit 29. The control unit 29 switches on the electric drive motor 72 of the pressure modulator 35 associated with the wheel experiencing the drive slip, so that the pump 71 aspirates pressure fluid from the supply container 73 through the line 75 and pumps it through the pressure line 77 into the pressure modulator 35. The pressure fluid acting upon the primary piston 41 displaces the stepped piston 40. In this process the valve assembly 59, because of the action of the compression spring 63, is closed and the pressure course to the master brake cylinder 11 is blocked. The secondary piston 48 moving into the through bore 47 positively displaces brake fluid located in the bore, and via the wheel brake line 16.1 this brake fluid builds up brake pressure in the wheel brake cylinder 18. A pressure becomes operative in the wheel brake cylinder 18 that is reinforced compared with the pressure of the pressure fluid, in accordance with the transmission ratio between the effective surface area of the primary piston 41 and that of the secondary piston 48. By suitable triggering of the drive motor 72 with a current dimensioned by the control unit 29, the level of the brake pressure can be varied. To keep the brake pressure at a constant level, the drive motor 72 is triggered such that pumping of pressure fluid by the pump 71 does not occur. If there is some disruption in motor triggering, the check valve 82 in the line 81 prevents an excessive increase in pressure, because upon attainment of a preset pressure the pressure fluid is diverted into the supply container 73.

As FIG. 2 clearly shows, the pressure fluid acting upon the primary piston 41 is hermetically separated from the brake fluid present at the secondary piston 48 by the air-filled bore chamber 49. The most suitable medium can therefore be used for the pressure fluid on the one hand and the brake fluid on the other, because mixing of the two is reliably prevented. The change in volume of the bore chamber 49 resulting from the motion of the stepped piston 40 brings about an exchange of air with the ambient air through the air filter 51, but prevents the entry of foreign bodies into the pressure modulator 35.

To decrease the brake pressure operative in the wheel brake cylinder 18, the control unit 29 triggers the electric drive motor 72 with a lower current than that for pressure buildup or pressure maintenance. The brake pressure prevailing in the through bore 47 now, along with the restoring compression spring 50, displaces the stepped piston 40 to meet the bottom plate 42. In this process, the pressure fluid flowing through the pump 71 drives the pump in its return feed direction, counter to the torque of the drive motor 72. To lessen the abrupt braking of the stepped piston 40 upon impact with the bottom plate 42, the return flow of pressure fluid is delayed by the throttle 79 in the bypass line 80. This damping of the return stroke also prevents the aspiration of air from the bore chamber 49 into the pressure fluid, past the seal 52 of the primary piston 41, whenever the pump 71 reaspirates fluid upon impact of the stepped piston 40 on the bottom plate 42 as a result of the inertia of the pump rotor 83. The clutch 74 also disconnects the rotating motor rotor from the rotor 83 of the pump 71 at the end of the return stroke. The rotor of the drive motor 72 can now come to a stop counter to the action of the remaining current supply without having the effect of driving the pump 71. As a result, the danger that air will be aspirated from the bore chamber 79 is likewise reduced. The disconnection of the drive train between the motor 72 and the pump 71 can occur automatically if a free-wheel clutch is used, or can be done by means of the control unit 29 if a shifting clutch is used. Finally, the drive motor 72 is switched off by the control unit 29 once the stepped piston 40 has been returned to its outset position.

Immediately before the end of the return stroke, the valve assembly 59 is also opened by the form-fitting engagement of the secondary piston 48 with the collar 64 of the tappet 62. The pressure course between the wheel brake cylinder 18 and the master brake cylinder 72 is thereby opened again, and any residual brake pressure that may still be present can drop again.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic brake system (10) for a vehicle having a master brake cylinder (11), a drive slip apparatus (22) including a control unit (29) for limiting drive slip at drivable vehicle wheels by controlling brake pressure applied to wheel brakes (19, 20) associated with these vehicle wheels, said drive slip apparatus includes a pressure modulator (35), including a housing (38), said pressure modulator (35) has a spring-loaded stepped position (40), which generates brake pressure for one of said wheels during drive slip, said stepped piston includes a large piston surface area which is acted upon by pressure fluid pumped by a motor-drive pump (71) from a supply container (73), the pump being embodied with reversible pumping directions and having a pressure fluid flowing through it both during a working stroke and a return stroke of the stepped piston (40), a valve assembly (59) is actuated by the stepped piston (40) as a function of the position of said stepped piston during drive slip control whereby the valve assembly closes off communication between the master brake cylinder and a wheel brake (20) and brake pressure fluid is fed via said valve assembly (59) into a brake line (16.1) extending between the master brake cylinder (11) and a wheel brake (20) to stop any drive slip, and said brake pressure at the wheel brake (20) is dimensioned by controlling the drive motor (72).

2. A brake system as defined by claim 1, in which said pump (71) is embodied as a gear pump with internal teeth, and said pump is drivable by an electric drive motor (72).

3. A brake system as defined by claim 2, in which said pump (71) and said drive motor (72) along with the supply container (73) are mounted on the housing (38) of the pressure modulator (35).

4. A brake system as defined by claim 2, which includes a line (81) that discharges into the supply container (73), said line (81) begins at a pressure outlet (76) of the pump (71), and a spring-loaded check valve (82) in said line (81) limits the pump pressure in said pressure outlet.

5. A brake system as defined by claim 1, in which said pump (71) and said drive motor (72) along with the supply container (73) are mounted on the housing (38) of the pressure modulator.

6. A brake system as defined by claim 5, which includes a line (81) that discharges into the supply container (73), said line (81) begins at a pressure outlet (76) of the pump (71), and a spring-load check valve (82) in said line (81) limits the pump pressure in said pressure outlet.

7. A brake system as defined by claim 1, which includes a line (81) that discharges into the supply container (73), said line (81) begins at a pressure outlet (76) of the pump (71), and a spring-load check valve (82) in said line (81) limits the pump pressure in said pressure outlet.

8. A brake system as defined by claim 1, which includes a bore (39) in the pressure modulator housing (38) for receiving the stepped piston (40), said stepped piston includes a primary piston (41) which on its circumference receives a seal (52), said primary piston defines an air-filled bore chamber (49), and a clutch (74) is provided to disconnect the pump (71) from the drive motor (72) upon reduction of brake pressure.

9. A brake system as defined by claim 8, in which said clutch (74) is a free-wheel clutch.

10. A brake system as defined by claim 8, in which said clutch (74) is a shifting clutch.

11. A brake system as defined by claim 1, which includes a check valve (78) that prevents a return flow of pressure fluid and a parallel-connected throttle (79) is disposed between the pressure side of the pump (71) and the pressure modulator (35).

12. A brake system as defined by claim 1, in which said valve assembly (59) has a seat valve disposed in the pressure modulator housing (38), said seat valve includes a movable, spring-loaded closing element (60) which is connected to a tappet (62) which extends coaxially with a longitudinal axis of the stepped piston (40), and said stepped piston is capable of engaging the tappet.

* * * * *